US007083221B2

(12) United States Patent
Hida

(10) Patent No.: US 7,083,221 B2
(45) Date of Patent: Aug. 1, 2006

(54) ARRANGEMENT STRUCTURE OF VEHICLE DOOR OPEN-CLOSE DEVICE

(75) Inventor: Kazunori Hida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/675,819

(22) Filed: Sep. 29, 2003

(65) Prior Publication Data

US 2004/0100119 A1 May 27, 2004

(30) Foreign Application Priority Data

Oct. 4, 2002 (JP) ............................ 2002-292327

(51) Int. Cl.
*B60J 5/10* (2006.01)

(52) U.S. Cl. .................................................. 296/146.8

(58) Field of Classification Search ............ 296/146.8, 296/203.01, 203.03, 146.1, 147, 151, 146.11, 296/146.9, 210, 56; 49/501, 502, 503
See application file for complete search history.

(56) References Cited

U.S. PATENT DOCUMENTS

| | | | | |
|---|---|---|---|---|
| 4,475,765 | A * | 10/1984 | Vogt et al. | 296/210 |
| 6,092,337 | A * | 7/2000 | Johnson et al. | 49/340 |
| 6,126,232 | A * | 10/2000 | Nakano | 296/210 |
| 6,137,249 | A * | 10/2000 | Butler et al. | 318/266 |
| 6,202,350 | B1 * | 3/2001 | Montgomery et al. | 49/139 |
| 6,270,147 | B1 * | 8/2001 | Butler et al. | 296/146.4 |
| 6,283,535 | B1 | 9/2001 | Yuge | |
| 6,299,241 | B1 * | 10/2001 | Heya et al. | 296/203.03 |
| 6,328,376 | B1 * | 12/2001 | Son | 296/203.03 |
| 6,382,706 | B1 * | 5/2002 | Yuge et al. | 296/146.4 |
| 6,513,859 | B1 * | 2/2003 | Yuge | 296/146.4 |
| 6,595,580 | B1 * | 7/2003 | Eberle et al. | 296/203.04 |
| 6,669,268 | B1 * | 12/2003 | Oberheide | 296/146.8 |
| 6,776,443 | B1 * | 8/2004 | Shimura et al. | 296/56 |
| 6,814,392 | B1 * | 11/2004 | Tomaszewski | 296/146.4 |
| 6,918,628 | B1 * | 7/2005 | Eipper et al. | 296/187.11 |
| 2001/0008057 | A1 * | 7/2001 | Sakaue et al. | 49/341 |
| 2001/0033086 | A1 * | 10/2001 | Yuge et al. | 296/56 |
| 2002/0032986 | A1 * | 3/2002 | Yuge | 49/339 |
| 2003/0218357 | A1 * | 11/2003 | Mitsui et al. | 296/146.8 |
| 2004/0124671 | A1 * | 7/2004 | Roehl | 296/203.04 |
| 2004/0124672 | A1 * | 7/2004 | Eipper et al. | 296/210 |

FOREIGN PATENT DOCUMENTS

| | | | | |
|---|---|---|---|---|
| DE | 4024837 | * | 2/1992 | 296/210 |
| DE | 197 34 320 | | 2/1999 | |
| DE | 10014367 | * | 9/2001 | |

(Continued)

*Primary Examiner*—H Gutman
(74) *Attorney, Agent, or Firm*—Hamre, Schumann, Mueller & Larson, P.C.

(57) ABSTRACT

An arrangement structure of a vehicle door open-close device to automatically open and close a vehicle door by a driving force. The arrangement structure comprises of a roof member, a side member, and a gazette member. The roof member is provided on a door-opening area for constituting a ceiling member of a vehicle body. The side member is provided on the door-opening area for constituting a side portion of a vehicle body. The gazette member is provided on the door-opening area for being attached to the roof member and the side member so as to extend over the roof member and the side member. Furthermore, the vehicle door open-close device is ranged in a space surrounded by the roof member, the side member, and the gazette member.

18 Claims, 4 Drawing Sheets

FOREIGN PATENT DOCUMENTS

| | | | | | |
|---|---|---|---|---|---|
| EP | 1 070 818 | | 1/2001 | | |
| EP | 1 260 426 | | 11/2002 | | |
| EP | 1260426 | * | 11/2005 | | |
| JP | 360035670 A | * | 2/1985 | | 296/106 |
| JP | 404063773 | * | 2/1992 | | 296/210 |
| JP | 406127433 | * | 5/1994 | | 296/210 |
| JP | 406239267 | * | 8/1994 | | 296/203.01 |
| JP | 6-255539 | | 9/1994 | | |
| JP | 406263063 | * | 9/1994 | | 296/210 |
| JP | 2000-335245 | | 12/2000 | | |
| WO | WO 02/070324 | * | 9/2002 | | |
| WO | WO 02/070326 | * | 9/2002 | | |

* cited by examiner

ARRANGEMENT STRUCTURE OF VEHICLE DOOR OPEN-CLOSE DEVICE

FIELD OF THE INVENTION

The present invention relates to an arrangement structure of a vehicle door open-close device.

BACKGROUND OF THE INVENTION

Any kinds of vehicle door open-close devices are disclosed as a devices to automatically open and close a back door of vehicles. (For example, P3, P4, and FIG. 1 of Japanese unexamined Patent Publication 2000-335245)

These kinds of devices are provided in a vehicle room as a driving device of an electric motor, etc., to open and close a door through a link system hinge arm member, etc.

At a position to arrange these kinds of vehicle door open-close devices in a vehicle room, it is advantageous to choose one corner portion of an opening area where a door opens and closes (hereinafter referred to as a door-opening area). This corner portion is a position that a roof member and a side member are connected to each other. The reason why this corner is an advantageous position comes from the viewpoint that it can secure enough space and enough strength to mount the vehicle door open-close device on the vehicle room.

A vehicle door open-close device disclosed in aforementioned Japanese unexamined Patent Publication 2000-335245 is also arranged on a corner portion of a door-opening area.

However, as shown in FIG. 1, some vehicles include the door-opening area wherein one corner portion thereof is formed into a gentle curve. In this case, it is difficult to arrange a vehicle door open-close device on the corner portion due to a lack of enough space. Additionally, the vehicle door open-close device is usually supported by a roof member and a side member. Accordingly, a roof member and a side member are required to have a sufficient strength to mount the door open-close device thereon.

Therefore, in order to solve the aforementioned drawbacks, the purpose of the present invention is to provide an arrangement structure of a vehicle door open-close device capable of securing enough space and enough strength to mount the vehicle door open-close device on a vehicle room even though the corner portion of the door-opening area is formed into a gentle curve.

SUMMARY OF THE INVENTION

To solve aforementioned drawbacks, the present invention was made to provide an arrangement structure of a vehicle door open-close device to automatically open and close a vehicle door by means of a driving force. The arrangement structure is comprised of a roof member, a side member, and a gazette or strengthening member. Herein, the roof member is provided on a door-opening area for constituting a ceiling member of a vehicle body. The side member is provided on the door-opening area for constituting a side portion of a vehicle body. A gazette member is provided on the door-opening area for being attached to the roof member and the side member so as to extend over said roof member and said side member. Under this condition, the vehicle door open-close device is arranged in a space surrounded by said roof member, said side member, and said gazette member. According to this arrangement structure, enough space can be efficiently secured to arrange the vehicle door-open close device therein. In the meantime, enough strength can be secured by a gazette member as a reinforcing function to attach the vehicle door open-close device to said roof member and the said side member. Thus, the space and strength can be secured even though the corner portion of the door-opening area is formed into a gentle curve.

Additionally, the arrangement structure is also comprised of the following. Said roof member includes an outside roof member and an inside roof member. Said side member includes an outside side member and an inside side member. Said gazette member is attached to said inside roof member and said inside side member so as to extend over said roof member and said side member. And said inside roof member and said inside side member are connected to a connecting portion wherein said outside roof member and said outside side member are connected to each other.

According to this arrangement structure, the roof member and the side member can be constituted as a closing cross-sectional shape so that strength of the roof member and the side member around the connecting portion is increased. Thereby, strength can be secured for attaching the vehicle door open-close device and the gazette member to said roof member and the side member.

Furthermore, the arrangement structure is also comprised of the following. A roof reinforcing member is provided on said roof member, while a side reinforcing member is provided on said side member. When both the roof reinforcing member and the side reinforcing member are connected to said connecting part, the strength of the roof member and the side member around the connecting part is increased. Thereby, strength can be sufficiently secured for attaching the vehicle door open-close device and the gazette member to said roof member and the side member.

Still further, the arrangement structure is also comprised of the following. An attachment reinforcing member is provided on an attaching part of said inside roof member or said inside side member wherein said gazette member is attached thereto. The attachment reinforcing member is connected to said connecting portion. Thereby, strength can be sufficiently secured for attaching the vehicle door open-close device and the gazette member to said roof member and the side member.

DETAILED EXPLANATION OF THE PREFERRED EMBODIMENTS OF THE INVENTION

The embodiment of the present invention will be now described with reference to the accompanying drawings.

Figure 2:
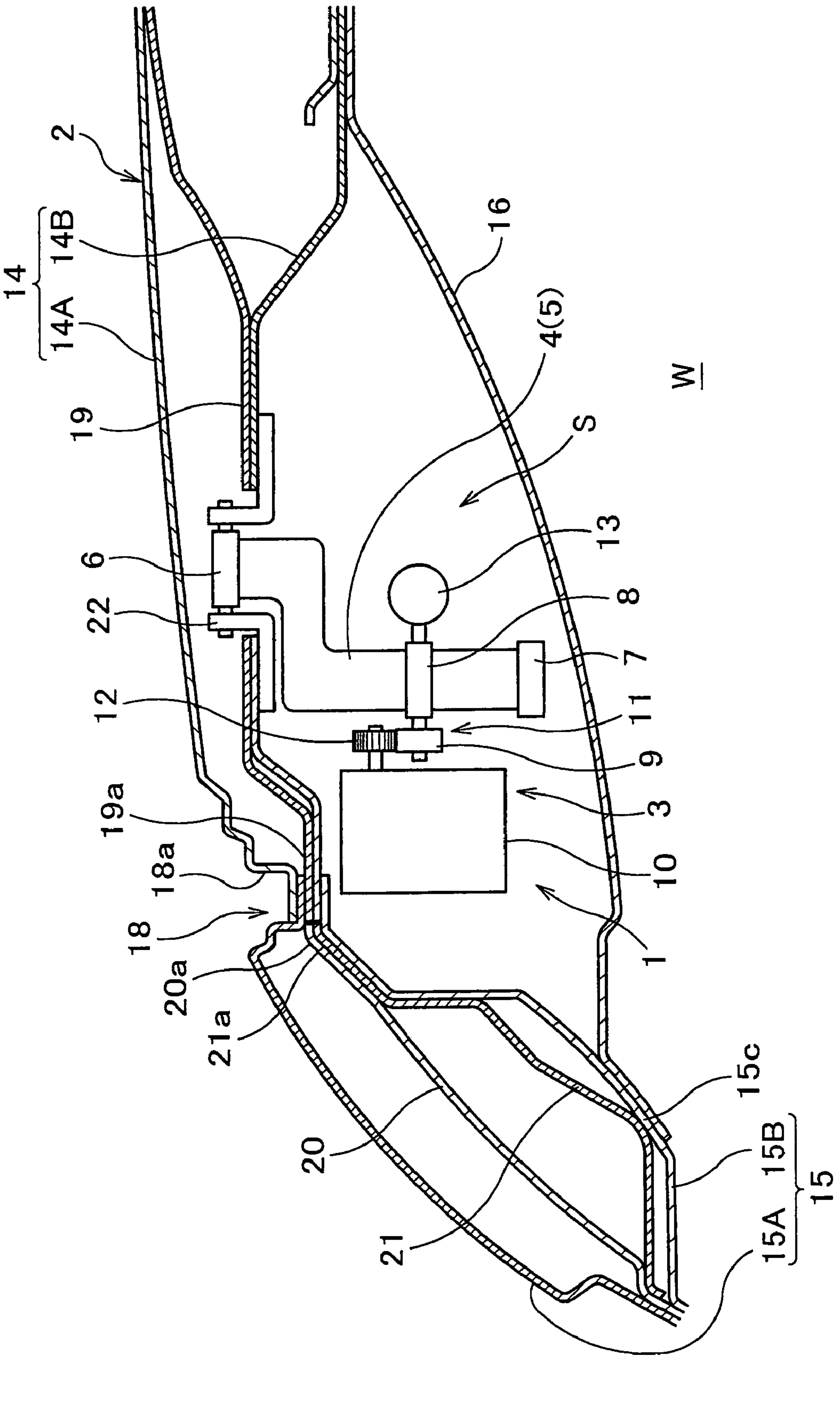
FIG. 2 is an explanatory cross sectional view taken along the A—A line in FIG. 4A to show an arrangement structure of a vehicle door open-close device.
Figure 3:
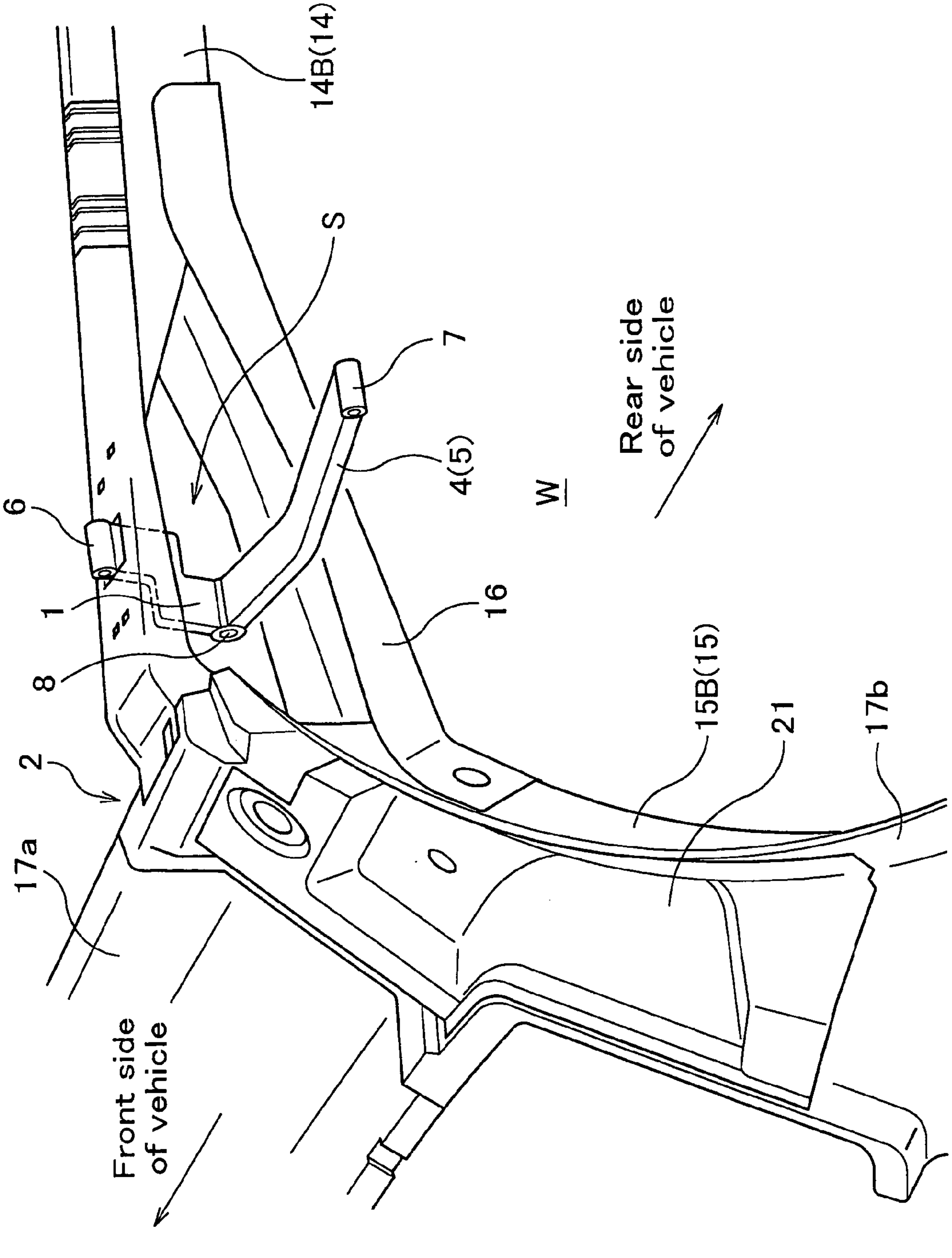
FIG. 3 is a perspective view showing around a door-opening area wherein a vehicle door open-close device is arranged.
Figure 4A:
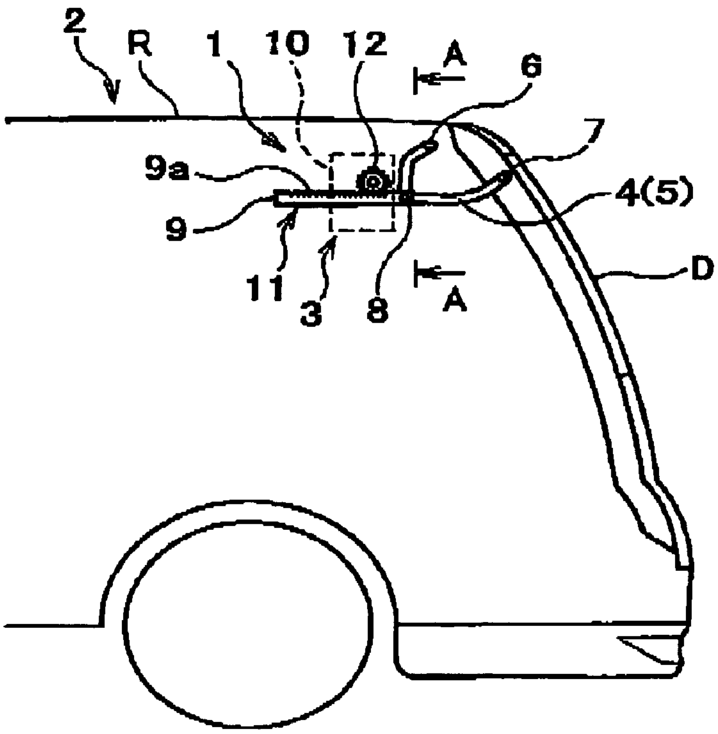
FIG. 4A is an explanatory side view showing a substantially the arrangement position of the vehicle door open-close device in a vehicle room when a door is fully closed.
Figure 4B:
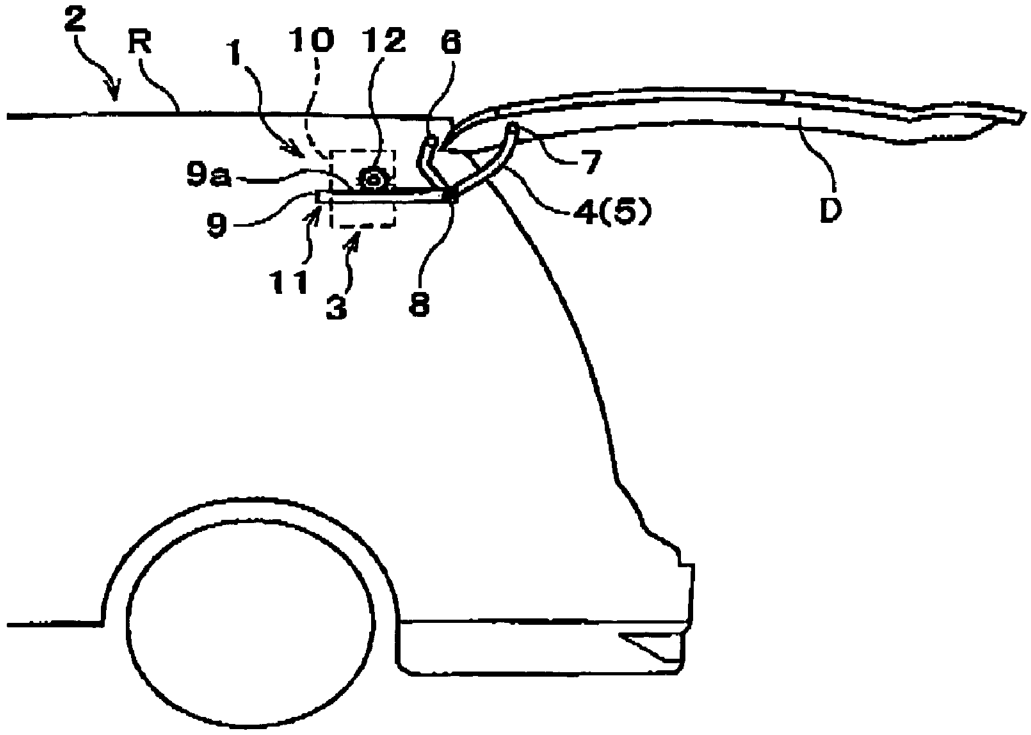
FIG. 4B is an explanatory side view showing substantially arrangement position of the vehicle door open-close device in a vehicle room when a door is fully opened.

FIG. 2 is an explanatory cross sectional view taken along the A—A line in FIG. 4A to show an arrangement structure of a door open-close device. FIG. 3 is a perspective view showing around a door-opening area wherein a door open-close device is arranged. FIGS. 4A and 4B are explanatory side views showing substantially the arrangement position of the door open-close device in a vehicle room. Herein, FIG. 4A shows a state when a door is fully closed, while FIG. 4B shows a state when a door is fully opened.

As shown in FIGS. 4A and 4B, a door open-close device 1 is utilized as a device to automatically open and close a back door (hereinafter simply referred to as a door) of such as a wagon typed vehicle. A door D is, as it were, a swing door capable of rotating around an axis (not shown) provided in a width direction of a vehicle. Herein, the axis is located in the vicinity of a rear end portion of the roof of a vehicle main body (hereinafter referred to as a vehicle body). Furthermore, the door open-close device 1 is mounted on a rear end portion of a roof R of a vehicle body 2 so as to include a driving means 3 and a link means 5. Herein, the link means 5 includes a link arm 4 or the like to open and close the door D by means of a driving force of the driving means 3.

Now, descriptions will be made to explain one example of the link means 5 with reference to FIGS. 4A and 4B. The link arm 4 has a shape, which was bent into approximately V shape seen in the side. One end portion of the link arm 4 is connected to the vehicle body 2 through a linking part 6 in such a manner that the link arm 4 is capable of rotating around an axis provided in a width direction of a vehicle. (Specifically, it is connected to a shaft supporting member 22 through the linking part 6. Herein, the shaft supporting member 22 is attached to an inside roof member 14B as shown in FIG. 2. The inside roof member 14B and the shaft supporting member 22 will be described later.) In the meantime, the other one end portion of said link arm 4 is connected to the door D through a link member 7 in such a manner that the link arm 4 is capable of rotating around an axis provided in a vehicle width direction. However, depending upon cases, said other one end portion of the link arm 4 is connected to the door D through the link member 7 so as to be fixed to the door D. Furthermore, a bending portion of the link arm 4 is attached to a slide member 9 through a base end linking part 8 in such a manner that the link arm 4 is capable of rotating around an axis provided in a width direction of the vehicle. Herein, the slide member 9 is one of components of the driving means 3.

For example, the driving means 3 comprises a driving source 10, a control unit (not shown), and a power transmission mechanism 11. Herein, the driving source 10 is constituted of an electric motor or the like. The control unit is a device to control the driving source 10. The power transmission mechanism 11 is a mechanism to transmit a drive force of the driving source 10 to said link means 5 (link arm 4).

For example, as the power transmission mechanism 11, a rack and pinion mechanism is utilized such that a rack gear 9*a* is formed on an upper surface of said slide member 9. Specifically, an output gear 12 is engaged with the rack gear 9*a*. In the meantime, the output gear 12 is rotated by means of an output of the drive source 10 through the speed reducer. Thereby, when the output gear 12 rotates a predetermined rotation angle clockwise or counterclockwise, the slide member 9 is moved to a longitudinal direction of the vehicle. (Actually, at this time, the slide member 9 is slightly vibrating in a vertical direction of the vehicle.)

FIG. 4A shows a state that the slide member 9 is located on a front side of the vehicle and that the door D is fully closed. When the output gear 12 rotates and the slide member 9 is moved to a rear side of the vehicle as shown in FIG. 4B, the link arm 4 is pushed to a rear side of the vehicle through the base end linking part 8. At this time, the link arm 4 rotates around the linking part 6. Thereby, the door D is opened as shown in FIG. 4B.

Furthermore, a reference numeral 13 shown in FIG. 2 indicates a gas damper arranged along a longitudinal direction of the vehicle. One end portion of the gas damper is attached to a bracket (not shown), while the other end portion of the gas damper is attached to said base end linking part 8. The gas damper 13 has impetus to rotatably open the door D. Thus, when the door D is closed by hands, proper force is required to resist the impetus (function of the gas damper 13). Additionally, a clutch mechanism (not shown) having a known structure is provided between the driving source 10 and the output gear 12. When the clutch is disengaged to disconnect the driving source 10 with the output gear 12, the driving force of the drive source 10 is not transmitted to the output gear 12. Thereby, the door D can be opened and closed by hands due to proper opening-closing force of said impetus (function of the gas damper 13).

As shown in FIG.2, aforementioned vehicle door open-close device 1 is arranged on an upper corner portion (a left upper corner portion in the present embodiment) of the door opening area W.

Herein, the drive source 10, the control unit (not shown) controlling said drive source 10, the drive means 3 including the power transmission mechanism 11 or the like, and the gas damper 13 are arranged in the vehicle room. The link arm 4 as the linking means 5 is arranged in the vehicle room so as to protrude from the door-opening area W to outside of the vehicle body when the door D is opened.

The driving means 3 and the gas damper 13 are attached to a supporting bracket (not shown) so as to be vertically hanging from the supporting bracket, which is extended over the roof member 14 and the side member 15 shown in FIGS. 2 and FIG. 3. In this case, strength of the roof member 14 and the side member 15 must be secured in consideration of weights of the driving means 3, the gas damper 13, and the link means 5. However, when a reinforcing member such as a rib is simply attached to the roof member 14 and the side member 15, utilizing space of the door-opening area W is reduced. This structure brings about a drawback such that the link arm 4 and other component members of the door open-close device 1 cannot sufficiently operate due to existence of a reinforcing member.

To solve aforementioned drawbacks, the present invention was made to provide the following arrangement structure. The roof member 14, the side member 15, and the gazette or strengthening member 16 are provided in the door opening area W. The gazette member 16 is attached to said roof member 14 and said side member 15 so as to be extended over said roof member 14 and said side member 15. Under this condition, the vehicle door open-close device 1 is arranged in a space S surrounded by said roof member 14, said side member 15, and said gazette member 16. A contour of the gazette member 16 is a concave shape gently bending toward a center of the door-opening area. One end portion of the gazette member 16 is fixed to the roof member 14 by means of a welding or the like. In the meantime, the other end portion of the gazette member 16 is fixed to the side member 15 by means of a welding or the like. Herein, the position of fixing the gazette member 16 to the side member 15 is lower than the position of fixing the gazette member 16 to the roof member 14. Thereby, the gazette member 16 serves as a reinforcement or a diagonal beam to support the roof member 14 and the side member 15.

The roof member 14 constitutes a ceiling portion of the vehicle body, while the side member 15 constitutes a side portion of the vehicle body. As shown in FIG. 2, the roof member 14 includes an outside roof member 14A and an inside roof member 14B, while the side member 15 includes an outside member 15A and an inside member 15B. Said gazette member 16 is attached to both the inside roof member 14B and the inside side member 15B so that said gazette member 16 is placed between said inside roof member 14B and said inside side member 15B. The outside roof member 14A and the outside side member 15A are members constituting a design face providing the appearance of a vehicle body. FIG. 3 is a perspective view showing around the door-opening area. In FIG. 3, the outside roof member 14A and the outside side member 15A are not illustrated. As shown in FIG. 3, the inside side member 15B is comprised of a side member 17*a* and a rear pillar member 17*b*. Herein, the side member 17*a* extends over a longitudinal direction of the vehicle body. The rear pillar member 17*b* extends over a vertical direction of the vehicle body. The inside side member 15B shown in FIG. 2 indicates a cross section of a joint part of the side member 17*a* and the side member 17*b*.

FIG. 3 is a perspective view corresponding to FIG. 4A to show a state that the door D is closed. In this state, the link arm 4, the slide member 9 (not shown), and the end portion of the gas damper 13 (not shown) are included in a space S. Herein, the slide member 9 is connected to the end base linking part 8 of the link arm 4 so as to serve as the power transmission mechanism 11. The end portion of the gas damper 13 is one end portion facing to a rear side of the vehicle body.

Thus, "the door open-close device 1 arranged in the space S" disclosed in the present invention can be defined as the following way. The door open-close device 1 means not only the door open-close device 1 as a whole but also at least one of component members (the drive means 3, the link means 5, and the gas damper 13) of the door open-close device 1.

As described above, when the gazette member 16 is attached to the roof member 14 and the side member 15 so as to extend over the roof member 14 and the side member 15, enough space can be obtained as the space S. The door open-close device 1 is arranged in said space S.

According to this structure, enough space can be efficiently secured to arrange the vehicle door open-close device therein. In the meantime, enough strength of the roof member 14 and the side member 15 can be secured by a gazette member 16 as a reinforcing function to support the vehicle door open-close device 1. The space and strength can be secured even though the corner portion of the door-opening area is formed into a gentle curve.

Now, descriptions will be made to explain a connecting part 18. As shown in FIG. 2, a reference numeral 18 indicates a connecting part wherein the outside roof member 14A and the outside side member 15A are connected thereto. A portion such as the connecting part 18 is generally called a Mohegan portion.

The connecting part 18 is provided in the following ways. One edge of the outside roof member 14A is bent toward inside of the vehicle body. Similarly, one edge of the outside side member 15A is also bent toward inside of the vehicle body. After that, a bent edge of the outside roof member 14A is lapped over a bent edge of the outside side member 15A to be connected to each other by means of a welding. Thereby, the connecting portion 18 is provided as a concave portion 18*a* as shown in FIG. 2. Herein, the concave portion 18*a* extends over a longitudinal direction of the vehicle body. Furthermore, a roof molding (not shown) is attached to the concave part 18*a* to obtain a good appearance of the vehicle body. Specifically, said connecting part 18 is provided as a connecting part of the outside roof member 14A and the outside side member 15A mainly to gain enough strength and a good appearance.

According to an arrangement structure of a door open-close device disclosed in the present embodiment, the inside roof member 14B and the inside side member 15B are connected to a lower face of said connecting part 18. On the other hand, a conventional arrangement structure of a door open-close device shown in FIG. 1 does not have a connecting part. Specifically, though the inside roof member 14B and the inside side member 15B are connected to each other, the inside roof member 14B and the inside side member 15B are not connected to the outside roof member 14A and the outside side member 15A.

As described above, according to the arrangement structure of the present embodiment shown in FIG. 2, the inside roof member 14B and the inside side member 15B are connected to a lower surface of said connecting portion 18 by means of a spot welding or the like. Thereby, one edge portion of the roof member 14 constituting of the outside roof member 14A and inside roof member 14B can be closed. Similarly, one edge portion of the side member 15 constituting of the outside side member 15A and inside side member 15B can be closed. Specifically, the roof member 14 and the side member 15 can be constituted as a closed cross-sectional shape, respectively.

According to the structure of the closed cross-sectional shape, the strength of the roof member 14 and the side member 15 in the vicinity of the connecting part 18 can be efficiently increased. Thereby, the strength of attaching the vehicle door open-close device 1 to the roof member 14 and the side member 15 can be certainly secured. Similarly, the strength of attaching the gazette member 16 to the roof member 14 and the side member 15 can be certainly secured. Additionally, the depth of said concave portion 18*a* is generally not so deep. Therefore, when each end portion of the inside roof member 14B and the inside side member 15B is connected to a lower surface of the connecting part 18, the following arrangement structure can be provided. The inside roof member 14B is provided in the vicinity of the outside roof member 14A, while the inside side member 15B is provided in the vicinity of the outside side member 15A. Thereby, a sectional area of said space S is increased so that a layout design of the vehicle door open-close device 1 can be widely selected. In the meantime, an interval between a top end portion of the door-opening area W and the gazette member 16 is reduced so that a sectional area of said door-opening area W is increased.

Furthermore, according to an arrangement structure of the vehicle door open-close device disclosed in the present embodiment, there are provided a roof reinforce member 19 and side reinforce member 20. The roof reinforce member 19 is provided between the outside roof member 14A and the inside roof member 14B to reinforce the roof member 14, while the side reinforce member 20 is provided between the outside roof member 15A and the inside roof member 15B to reinforce the side member 15. The roof reinforce member 19 and the side reinforce member 20 are connected to the connecting part 18. FIG. 2 shows a state that an end portion 19*a* of the roof reinforcement member 19 is connected to the connecting part 18 and an end portion 20_a_ of the side reinforcement member 20 is connected to the connecting part 18 on the inside side member 15B.

According to the aforementioned structure, the strength of the roof member 14 and the side member 15 in the vicinity of the connecting part 18 is increased. Thereby, the strength of attaching the vehicle door open-close device 1 to the roof member 14 and the side member 15 can be certainly secured. Similarly, the strength of attaching the gazette member 16 to the roof member 14 and the side member 15 can be secured. Herein, the roof reinforcing member 19 and the side reinforcing member 20 are made of a steel plate or the like.

Still further, according to an arrangement structure of the vehicle door open-close device disclosed in the present embodiment, an attaching reinforcement member 21 is attached to an attaching part 15_c_ wherein the gazette member 16 is attached to the side member 15. In the present embodiment, the gazette member 16 is attached to the inside side member 15B. Herein, the attaching reinforcement member 21 is made of a steel plate or the like. Additionally, the attaching reinforcement member 21 is attached to the attaching part 15_c_ of the inside side member 15B such that the attaching reinforcement member 21 is facing to the outside side member 15A. For example, the attaching reinforcement member 21 is attached to the attaching part 15_c_ by means of a spot welding when the gazette member 16 is attached to the side member 15 by means of a spot welding. Specifically, the attaching reinforcement member 21, the inside side member 15B, and the gazette member 16 are fixed to each other on the attaching part 15_c_.

Figure 1:
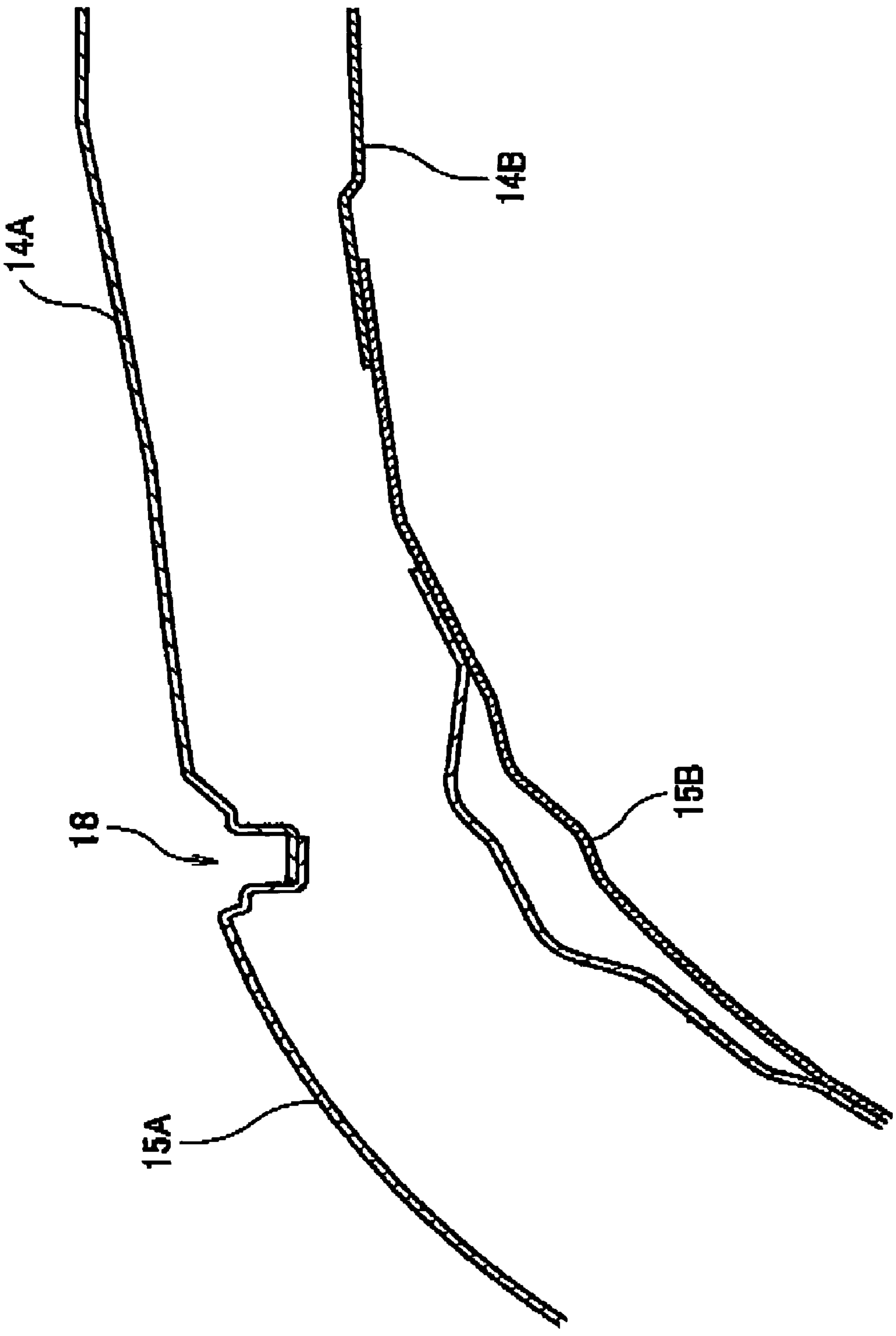
FIG.1 Prior Art
FIG. 1 is an explanatory cross sectional view showing a conventional structure of a roof member and side member.

Additionally, as shown in FIG. 1, an end portion 21_a_ of said attaching reinforcement member 21 is connected to said connecting part 18 by means of a welding or the like. Thus, the strength of the roof member 14 and the side member 15 in the vicinity of the connecting portion 18 is increased. Thereby, the strength of attaching the vehicle door open-close device 1 to the roof member 14 and the side member 15 can be secured. Similarly, the strength of attaching the gazette member 16 to the roof member 14 and the side member 15 can be secured. Herein, said attaching reinforcement member 21 can be provided on the roof member 14 too.

A preferred embodiment has been described as an explanation of the arrangement structure of the vehicle door open-close device with regard to the present invention. However, a layout design, a configuration, and a number of each component members are not restricted to the embodiment shown in the figures and are properly variable as long as it is not strayed from the substance of the present invention.

What is claimed is:

1. An arrangement structure of a vehicle door open-close device to automatically open and close a vehicle door by means of a driving force comprising:

a roof member provided on a door-opening area for constituting a ceiling member of a vehicle body, said roof member including an outside roof member and an inside roof member;

a side member provided on the door-opening area for constituting a side portion of the vehicle body, said side member including an outside side member and an inside side member; and a connecting part between the roof member and the side member;

a strengthening member located below the connecting part between the roof member and the side member and bridged across the connecting part and bridged between said inside roof member and said inside side member;

wherein said vehicle door open-dose device is arranged in a space surrounded by said roof member, said side member, and said strengthening member; and wherein said inside roof member and said inside side member are connected to the connecting part in which said outside roof member and said outside side member are connected thereto.

2. The arrangement structure of a vehicle door open-close device according to claim 1, wherein a roof reinforced member provided on said roof member and a side reinforced member provided on said side member are connected to said connecting part.

3. The arrangement structure of a vehicle door open-close device according to claim 1, wherein an attaching pan of said inside side member is attached to an attaching reinforcement member, and said attaching reinforcement member is connected to said connecting part.

4. The arrangement structure of a vehicle door open-close device according to claim 2, wherein an attaching part of said inside side member is provided with an attaching reinforcement member, and said attaching reinforcement member is connected to said connecting part.

5. The arrangement structure of a vehicle door open-close device according to claim 2, wherein said roof reinforced member is positioned between said outside roof member and said inside roof member, and said side reinforced member is positioned between said outside side member and said inside side member.

6. The arrangement structure of a vehicle door open-close device according to claim 1, wherein said strengthening member is formed of a single member.

7. The arrangement structure of a vehicle door open-close device according to claim 1, wherein said strengthening member is a diagonal beam connecting the roof member and the side member with each other.

8. The arrangement structure of a vehicle door open-close device according to claim 1, wherein a point of connection of the strengthening member to the side member is vertically lower than a point of connection of the strengthening member to the roof member.

9. An arrangement structure of a vehicle door open-close device to autocratically open and close a vehicle door by means of a driving force applied to the vehicle door by a driving mechanism that includes a driving source and a power transmitter linked to the vehicle door, comprising:

a roof member provided at a door-opening area, at least a portion of the roof member forming a ceiling member of a vehicle body;

a side member provided at the door-opening area, at least a portion of the side member forming a side portion of the vehicle body; and a connecting part between the roof member and the side member;

a strengthening member located below the connecting part between the roof member and the side member and bridged across the connecting part;

wherein said vehicle door open-close device, including the driving source and the power transmitter of the driving mechanism, is arranged in a space surrounded by said roof member, said side member, and said strengthening member.

10. An arrangement structure of a vehicle door open-close device according to claim 9, wherein;

said roof member including an outside roof member and an inside roof member;

said side member including an outside side member and an inside side member; and said strengthening member is bridged between said inside roof member and said inside side member;

wherein said inside roof member and said inside side member are connected to the connecting part in which said outside roof member and said outside side member are connected thereto.

11. The arrangement structure of a vehicle door open-close device according to claim 10, wherein a roof reinforced member provided on said roof member and a side reinforced member provided on said side member are connected to said connecting part.

12. The arrangement structure of a vehicle door open-close device according to claim 10, wherein an attaching part of said inside side member is attached to an attaching reinforcement member, and said attaching reinforcement member is connected to said connecting part.

13. The arrangement structure of a vehicle door open-close device according to claim 11, wherein an attaching part of said inside side member is provided with an attaching reinforcement member, and said attaching reinforcement member is connected to said connecting part.

14. The arrangement structure of a vehicle door open-close device according to claim 11, wherein said roof reinforced member is positioned between said outside roof member and said inside roof member, and said side reinforced member is positioned between said outside side member and said inside side member.

15. The arrangement structure of a vehicle door open-close device according to claim 9, wherein said strengthening member is formed of a single member.

16. The arrangement structure of a vehicle door open-close device according to claim 9, wherein said strengthening member is a diagonal beam connecting the roof member and the side member with each other.

17. The arrangement structure of a vehicle door open-close device according to claim 9, wherein a point of connection of the strengthening member to the side member is vertically lower than a point of connection of the strengthening member to the roof member.

18. An arrangement structure of a vehicle door open-close device to automatically open and close a vehicle door by means of a driving force comprising:

a roof member provided on a door-opening area for constituting a ceiling member of a vehicle body;

a side member provided on the door-opening area for constituting a side portion of the vehicle body; and a strengthening member which is separate from said roof member and said side member and connects, from the door-opening area, with said roof member and said side member such tat said strengthening member is extended across a connecting part between said roof member and said side member, wherein said vehicle door open-close device is arranged in a space surrounded by said roof member, said side member, and said strengthening member.

* * * * *